US010809170B2

(12) United States Patent
Farhad et al.

(10) Patent No.: US 10,809,170 B2
(45) Date of Patent: Oct. 20, 2020

(54) DYNAMIC MECHANICAL ANALYSIS (DMA) MEASUREMENT SYSTEM WITH AN ADJUSTABLE CLAMP ASSEMBLY

(71) Applicants: Siamak Farhad, Copley, OH (US); Roja Esmaeeli, Akron, OH (US)

(72) Inventors: Siamak Farhad, Copley, OH (US); Roja Esmaeeli, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 165 days.

(21) Appl. No.: 16/037,426

(22) Filed: Jul. 17, 2018

(65) Prior Publication Data

US 2019/0017912 A1    Jan. 17, 2019

Related U.S. Application Data

(60) Provisional application No. 62/681,351, filed on Jun. 6, 2018, provisional application No. 62/533,188, filed on Jul. 17, 2017.

(51) Int. Cl.
| | |
|---|---|
| *G01N 3/34* | (2006.01) |
| *G01N 3/08* | (2006.01) |
| *G01N 3/32* | (2006.01) |
| *G01B 11/16* | (2006.01) |
| *G01M 17/02* | (2006.01) |
| *G01B 21/32* | (2006.01) |

(52) U.S. Cl.
CPC ............... *G01N 3/34* (2013.01); *G01B 11/16* (2013.01); *G01N 3/08* (2013.01); *G01N 3/32* (2013.01); *G01B 21/32* (2013.01); *G01M 17/02* (2013.01); *G01N 2203/0008* (2013.01); *G01N 2203/0051* (2013.01); *G01N 2203/0094* (2013.01); *G01N 2203/0688* (2013.01); *G01N 2203/0694* (2013.01); *G01N 2291/02827* (2013.01)

(58) Field of Classification Search
None
See application file for complete search history.

(56) References Cited

U.S. PATENT DOCUMENTS

| 5,297,441 A | * | 3/1994 | Smith | G01N 3/04 |
| | | | | 73/818 |
| 5,425,276 A | * | 6/1995 | Gram | G01N 3/32 |
| | | | | 73/781 |

(Continued)

*Primary Examiner* — Natalie Huls
*Assistant Examiner* — Jermaine L Jenkins
(74) *Attorney, Agent, or Firm* — Renner Kenner Greive Bobak Taylor & Weber (57) ABSTRACT

A dynamic mechanical analysis system provides an actuator that imparts expansion and contraction forces (e.g. shear force) to a viscoelastic material at high frequencies. Such high frequency analysis allows for the direct and accurate measurement of the characteristics of the material at high expansion/contraction frequencies directly, without the use of additional predictive analysis techniques, such as time-temperature superposition. The system also utilizes a clamping system, whereby two different sections of the viscoelastic material are held in place between by a pair of fixed clamps and a force member that is moved by the actuator. As such, the system is able to subject the viscoelastic material sample to simulated "road" conditions to identify various performance properties associated with the material sample.

19 Claims, 8 Drawing Sheets

(56) References Cited

U.S. PATENT DOCUMENTS

| | | | | |
|---|---|---|---|---|
| 5,578,762 | A | * | 11/1996 | Chiaro ................. G01M 11/088 73/833 |
| 6,146,013 | A | * | 11/2000 | Huetter .............. G01N 25/4866 374/10 |
| 6,205,862 | B1 | * | 3/2001 | Nakamura ............... G01N 3/00 73/796 |
| 6,386,045 | B1 | * | 5/2002 | Nakamura ............... G01N 3/32 73/760 |
| 7,051,600 | B1 | * | 5/2006 | Cavallaro ................ G01N 3/08 73/862.041 |
| 8,931,349 | B2 | * | 1/2015 | Schwenke ................ G01N 3/08 73/788 |
| 8,978,479 | B2 | * | 3/2015 | Okubo .................... G01N 3/04 73/788 |
| 10,288,541 | B2 | * | 5/2019 | Hadj Henni ............. G01N 3/32 |
| 2013/0047741 | A1 | * | 2/2013 | Woo ........................ G01N 3/20 73/760 |
| 2013/0174666 | A1 | * | 7/2013 | Hadj Henni ........... G01N 11/16 73/800 |

* cited by examiner

DYNAMIC MECHANICAL ANALYSIS (DMA) MEASUREMENT SYSTEM WITH AN ADJUSTABLE CLAMP ASSEMBLY

CROSS-REFERENCE TO RELATED APPLICATIONS

This application claims the benefit of U.S. Provisional Application No. 62/533,188 filed on Jul. 17, 2017, and U.S. Provisional Application No. 62/681,351 filed on Jun. 6, 2018, the contents of which are incorporated herein by reference.

STATEMENT REGARDING FEDERALLY SPONSORED RESEARCH OR DEVELOPMENT

This invention was made with government support under contract no. 1650423 awarded by The Division of Industrial Innovation and Partnerships (IIP) of the National Science Foundation (NSF). The government has certain rights in the invention.

TECHNICAL FIELD

Generally, the embodiments disclosed herein relate to testing systems for viscoelastic materials. In particular, the embodiments disclosed herein relate to testing systems that identify viscoelastic material properties directly. More particularly, the embodiments disclosed herein relate to testing systems that apply high frequency expansion-contraction forces to viscoelastic materials to directly identify their material properties.

BACKGROUND

Materials, such as rubber, which exhibit both viscous and elastic behaviors upon deformation are called viscoelastic materials. In particular, if a material is purely elastic, the phase difference between the stress and strain waves of the material is approximately zero degrees, whereas if the material is purely viscous, the phase difference between the stress and strain waves of the material is approximately 90 degrees. Accordingly, a viscoelastic material has a phase difference that is between these extremes. Therefore, if a viscoelastic material has a phase difference closer to zero degrees, the material has an elastic characteristic that is stronger than its viscous characteristic, and as a result, the storage modulus of the material is greater than its loss modulus. In contrast, if the phase difference of the viscoelastic material is closer to 90 degrees, its viscous characteristic is stronger than its elastic characteristic, and as a result, the loss modulus of the material will be greater than its storage modulus. In addition, for a given viscoelastic material, the phase difference between the stress and strain waves yielded thereby is a function of the material temperature and the frequency of these waves. For example, in the case of viscoelastic materials, such as tire tread rubber that is in contact with the road, the road texture determines the frequency or rate at which the rubber expands and contracts due to the tire rotation and sliding of the tire on the road. Thus, in addition to the chemical composition of the rubber, the phase difference and storage/loss modulus of the rubber tread depend on the wavelengths of the road texture profile. Road texture profiles typically have a wide range of wavelengths, and they determine the expansion-contraction frequencies of the tire tread rubber (i.e. the rate at which the tire tread rubber expands and contracts), as well as the dry and wet traction capabilities of the tread rubber. Furthermore, because a comparison of accident rates in dry and wet conditions shows that accidents on wet roads have higher rates than dry roads, it is important to study rubber tread at frequencies that correspond to wet rubber traction. Furthermore, it is generally known that to predict the behavior of wet traction performance of a viscoelastic rubber compounds, the viscoelastic properties of the material should be measured at frequencies in the range of approximately 1 kHz to 1 MHz. However, current dynamic mechanical analysis (DMA) measurement systems are not capable of operating at high enough frequencies with strain amplitudes that are sufficient to complete direct measurements of tire rubber performance characteristics or properties. As a result, current DMA systems must indirectly estimate the tire rubber performance characteristics utilizing a time-temperature superposition calculation technique, which is undesirable.

In general, dynamic mechanical analysis (DMA) is a technique in which a stress or strain is applied to a viscoelastic material to obtain phase angle and deformation data of the viscoelastic material. From this data, the damping factor, tan $\delta$, can be calculated, whereupon complex modulus and viscosity data can be determined. Two approaches are typically used to carry out the stress/strain measurements using DMA: (a) forced vibration frequency, whereby a force is applied repeatedly to the material at a particular frequency (i.e. a periodic force is applied to the material to cause it to vibrate at a particular frequency), and (b) free resonance, where the material is perturbed (i.e. a force is applied) and then the material is allowed to exhibit free resonance decay (i.e. a periodic force is applied to the material to cause it to vibrate at its resonance frequency). The forced vibration DMA measurement technique is limited to a maximum frequency that it can utilize, which is limited to about 200 Hz for shear tests. The free resonance technique allows the modulus of the material to be calculated using a combination of the resonance frequency, the resultant amplitude and the material dimensions. The free resonance techniques have several drawbacks including that the frequency dependent material measurements are difficult to perform and require the use of different material geometries, the method is not capable of controlling the strain applied to the material. For example, in tire tread testing, it is important to be able to set an exact strain, such as about 0.05% for example, in high frequency tests that simulate wet traction. That is, the free resonance technique is not capable of controlling the strain, and is only able to test materials at frequencies of approximately 10 kHz, whereby depending on the dimensions/geometry of the material being tested the force resonance technique can achieve different strains. In addition, the free resonance test is only capable of testing raw or pastry material (the raw material must be injected into a clamp and then cured), and therefore such testing technique is only suitable for use with new rubber and not aged rubber. In order to overcome this limitation, researchers have utilized a time-temperature superposition technique in combination with DMA to indirectly assess viscoelastic properties. The time-temperature superposition technique involves decreasing the temperature of rubber and then performing the DMA analysis at low frequencies, whereupon master curves, or the Williams, Landel and Ferry (WLF) equation, are used to indirectly predict or estimate the rubber properties at high frequencies. Although the time and temperature dependency is a characteristic of viscoelastic materials, the WLF equation constants are not able to be easily obtained for different types of rubber. As such, the constants used by the WLF equation, or master curves, are based on known, previously studied rubber compounds. As a result, WLF constants that are based on types of rubber compound to evaluate new rubber compounds lead to inaccurate determinations of the properties of new rubber compounds, which is unwanted.

Thus, there are currently no dynamic mechanical analysis (DMA) testing devices available to perform direct shear tests at frequencies that approach the desired 10 kHz frequency region with strain amplitudes that are sufficient for testing viscoelastic materials that operate in high frequency deformation applications, such as tire tread rubber. In order to improve the identification of viscoelastic performance properties when exposed to high frequencies, especially for newly developed viscoelastic compounds, it is desirable that such compounds should be measured directly at high frequencies, instead of indirectly using the time-temperature superposition technique.

Therefore, there is a need for a dynamic mechanical analysis (DMA) system for analyzing viscoelastic materials, such as through the application of shear forces, at high frequencies of about 100 Hz to 10 kHz. In addition, there is a need for a dynamic mechanical analysis (DMA) system for analyzing viscoelastic materials at high frequencies that is configured to deliver displacement amplitudes of between approximately 0.05% to 0.75%. Furthermore, there is a need for a dynamic mechanical analysis (DMA) system that is capable of performing a direct measurement of viscoelastic material properties at high frequencies without using the WLF equation. In addition, there is a need for a dynamic mechanical analysis (DMA) system for analyzing viscoelastic materials at high frequencies of about 100 HZ to 10 kHz, while having independent control of the strain applied to the viscoelastic material being tested.

SUMMARY

In light of the foregoing, it is a first aspect of the various embodiments disclosed herein to provide a dynamic mechanical analysis (DMA) system that includes a fixture; an actuator attached to the fixture; a force sensor carried by the actuator; an adjustable clamp assembly attached to the fixture and adapted to hold an elastomeric material; a computing unit in operative communication with the force sensor and the actuator; wherein the actuator is configured to be controlled by the computing unit to apply a periodic force to the material at a test frequency between 100 Hz to 10 kHz, and wherein the force sensor measures the force applied by the actuator to the material.

It is yet another aspect of the various embodiments disclosed herein to provide a method of testing a viscoelastic material that includes fixing the viscoelastic material in a stationary position to a fixture; applying a periodic force to the material at a test frequency between 100 Hz to 10 kHz by an actuator attached to said fixture; identifying at least one viscoelastic property associated with the material based on said applying step.

BRIEF DESCRIPTION OF DRAWINGS

These and other features and advantages of the various embodiments disclosed herein will become better understood with regard to the following description, appended claims and accompanying drawings, wherein:

WRITTEN DESCRIPTION

A dynamic mechanical analysis (DMA) system is generally referred to by numeral 10, as shown in FIGS. 1-8 of the drawings. The system 10 includes a fixture 20 to which an actuator 30 and a clamp assembly 40 are attached. The actuator 30 is also attached to force sensor 50, while the clamp assembly 40 is configured to retain a section of viscoelastic material 60 therein. Thus, as the actuator 30 is operated, it periodically applies a force, such as a shear force, to the material 60 at a frequency that is between approximately 100 Hz to 10 kHz in order to directly measure various viscoelastic properties thereof, including but not limited to: loss modulus, storage modulus, shear, shear modulus, complex shear modulus, tan delta (i.e. phase lag between stress and strain). It should also be appreciated that the viscoelastic material 60 may include any viscoelastic material, including foods, metal rubber springs, and rubber materials, such as tire tread rubber.

The fixture 20 may comprise any suitable structure that is capable of supporting the actuator 30 and the clamp assembly 40. The fixture 20 may be formed of any suitable material, such as metal, polymeric material, such as plastic, composite material, or any combination thereof. It should be appreciated that the fixture 20 is designed to have a natural frequency that is higher than the test frequency, or frequency at which the force is applied by the actuator 30 to the material 60 in order to prevent resonance in the system 10 as a whole. For example, in some embodiments, the fixture 20 may be constructed to have a natural frequency that is approximately twice or more than test frequency that is being applied by the actuator 30 to the material 60. That is, in the case where the test frequency that is applied to the material 60 is 10 kHz, the fixture 20 is designed to have a natural frequency of 21 kHz for example.

The actuator 30 includes a base 100 and arm 110 that extends and retracts to apply the periodic high frequency force to the material 60 mounted in the clamp assembly 40. The base 100 of the actuator 30 is rigidly attached to the fixture 20, by any suitable means such as a threaded fastener, adhesive, welding or the like. It should be appreciated that the actuator 30 may comprise any suitable actuator capable of performing the functions discussed herein, such as a linear actuator for example. In addition, the actuator 30 may comprise a piezoelectric actuator, ultrasonic actuator, or any other type of actuator. Continuing, the elongated arm 110 of the actuator 30 is configured to retract and extend, such as along a linear path, so that it periodically applies a force such as a shear force, to the material 60 at a desired frequency between 100 Hz and 10 kHz. In some embodiments, the actuator 30 may operate in one mode so that the arm 110 applies a first force in a first direction and a second force in another direction (i.e. push and pull movement), such as a direction opposite to the first direction. In other modes, the actuator 30 may deliver a force in a first direction, and then move so that the arm 110 is out of contact with the viscoelastic material 60, thereby allowing the material 60 to return to a relaxed state. It should be appreciated that the actuator 30 may perform the movements associated with such modes at any desired frequency, including at frequencies between 100 Hz to 10 kHz, as well as ranges between 100 Hz to 1 kHz, 1 kHz to 10 kHz, 2 kHz to 10 kHz, 3 kHz to 10 kHz, 4 kHz to 10 kHz, 5 kHz to 10 kHz, 6 kHz to 10 kHz, 7 kHz to 10 kHz, 8 kHz to 10 kHz, and 9 kHz to 10 kHz. It should be appreciated that the force applied by the actuator may apply a shear force, as well as any other type of desired force to the material 60.

Attached to an end 150 of the actuator arm 110 is the force sensor 50. In some embodiments, the force sensor 50 may be attached to the end of the actuator arm 110 via an adapter 151. However, in other embodiments, the force sensor 50 may be directly attached to the end 150 of the arm 110 without the use of the adapter 151. The force sensor 50 may comprise any sensor suitable for measuring force, such as a piezoelectric sensor, a linear-variable differential transformer (LVDT) transformer, a strain gauge and the like. The force sensor 50 is configured to measure the force that is applied to the material 60 by the actuator arm 110. In some embodiments, the force sensor 50 may output an electrical signal corresponding to the amount of force measured by the sensor 50, which is communicated to a computing unit 200, which also controls the operation of the actuator 30 to be discussed in detail below.

Figure 6:
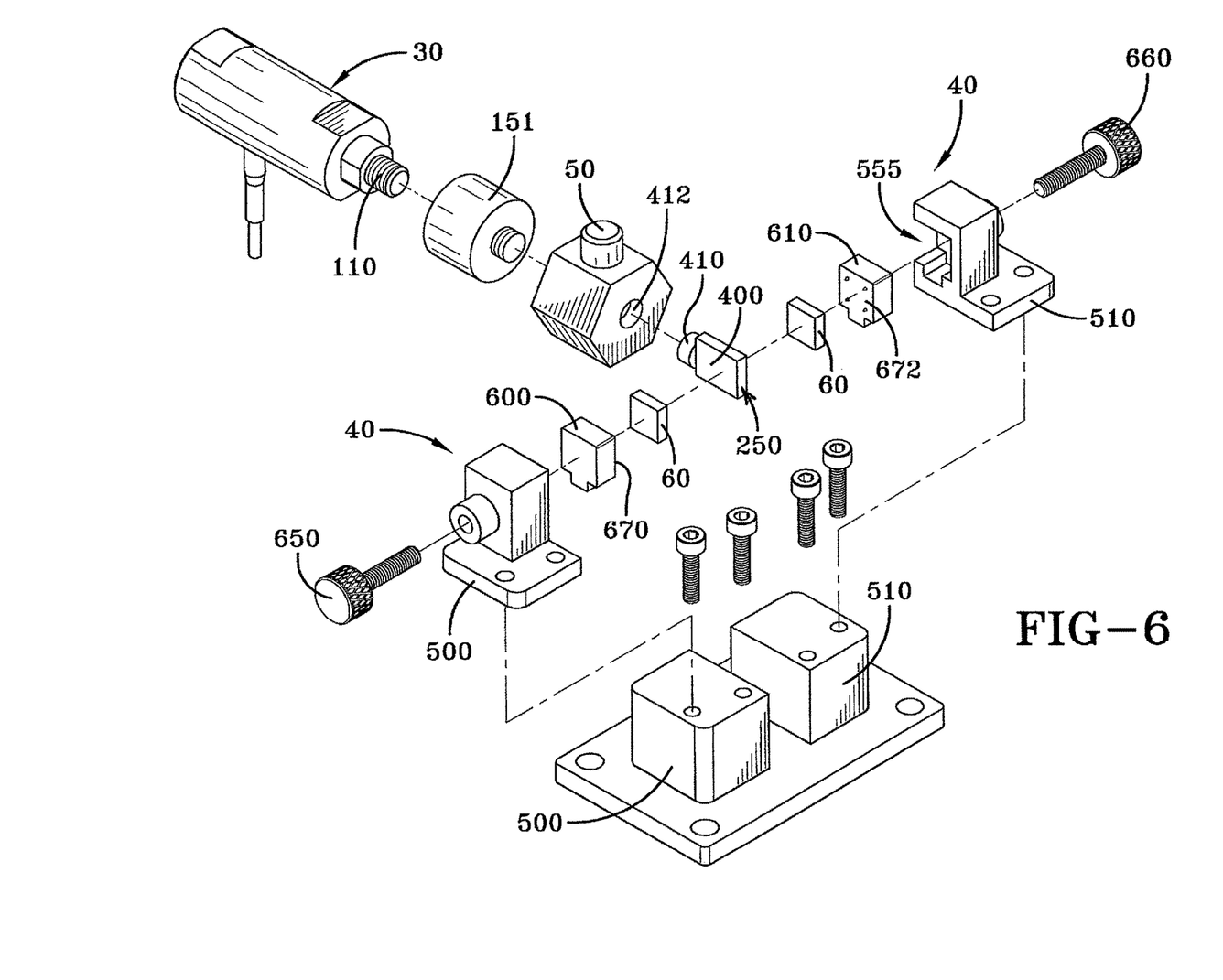
FIG. 6 is an exploded view of the DMA system in accordance with the various embodiments disclosed herein.
Figure 7:
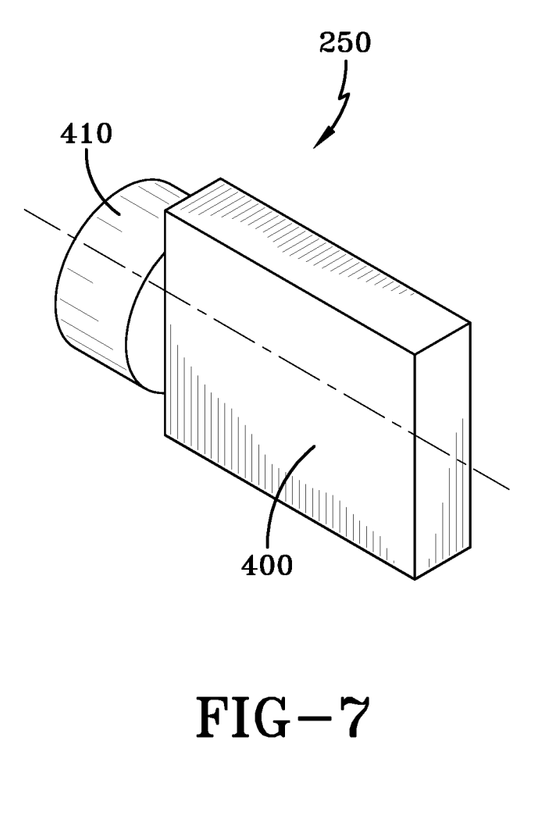
FIG. 7 is a perspective view of a floating clamp provided by the DMA system in accordance with the various embodiments disclosed herein.

In some embodiments, a force member 250 may be provided to be placed into attachment with the force sensor 50. However, in other embodiments, where the force sensor is not used, the force member 250 may be placed into direct attachment with the actuator arm 110. As shown clearly in FIGS. 3-4, the force member 250 is dimensioned to facilitate the application of a shear force with 2 sections material 60 simultaneously, and operates in conjunction with the other components of the clamp assembly 40 to be discussed. However, it should be appreciated that in some embodiments, the force member 250 may be used to apply the shear force to only a single section of material 60. As shown in FIG. 6, the force member 250 includes a substantially flat plate 400 from which extends a cylindrical attachment projection 410 that is configured for attachment to the force sensor 50 using any suitable means, such as a threaded connection, adhesive connection, or friction-fit connection. In some embodiments, the cylindrical attachment projection 410 is attachment to an aperture 412 disposed in the force sensor 50. Alternatively, in other embodiments, the force member 250 may be attached to the end 150 of the actuator arm 110, using any suitable means, such as a threaded connection, adhesive connection, or friction-fit connection. It should also be appreciated that the surfaces of the plate 400 that contact the material 60 may be smooth, textured, contoured, include gripping projections, or any combination thereof. In addition, the force member 250 may be formed of any suitable material, such as plastic metal, composite, or any combination thereof.

The clamp assembly 40 includes a first clamp member 500 and a second clamping member 510 that are rigidly attached to the fixture 20, so that they do not move relative thereto. In addition, the clamp members 500,510 are spaced apart by a gap 550 in which the material 60 is received. In some embodiments, the first and second clamp members 500,510 may be positionably adjusted relative to the fixture 20 so as to change the size of the gap 550. In other embodiments, the clamp members 500,510 may include respective jaws 600 and 610 that are adjustable to change the dimension of the gap 550 to facilitate the attachment and removal of different material samples 60. In some embodiments, the first and second clamp members 500,510 may include keyed cavities 555 to accommodate therein the particular shape and dimension of the jaws 600,610. Thus, the jaws 600,610 are used to selectively secure and release the material sample 60 from the clamp 40. That is they may be fixed or locked in position so that the sample material 60 does not move relative to the fixture 20. In some embodiments, the jaws 600,610 may be adjusted, such as in an axial direction, by the operation of respective threaded adjustment knobs 650,660. In some embodiments, the jaws 600,610 may freely slide within the cavities 555. The jaws 600 and 610 each have faces 670 and 672 that contact the material 60 and may include a flat surface, contoured surface, textured surfaces, gripping projections, such as teeth or pins, and the like to enhance the gripping ability of the jaws 600,610 with respect to the material sample 60. It should be appreciated that the jaws 600,610 may be formed of any suitable material, such as plastic, metal, composite, or any combination thereof.

The clamp assembly 40 may be configured to include the first and second clamp members 500,510 that are utilized with the force member 250. The force member 250 is positioned between the clamp members 500,510, and the jaws 600,610 if they are used, so as to form a first gap 700 and a second gap 710. The first and second gaps 700,710 are configured to each receive a section of the material 60 therein.

It should be appreciated that in some embodiments, the material sample 60 may also be retained to the clamp members 500 and 510 using any suitable means, such as adhesive, and may have textured surfaces, teeth, gripping pins, and the like to enhance the gripping ability of the clamp members 500,510 to hold the material sample 60.

Figure 9:
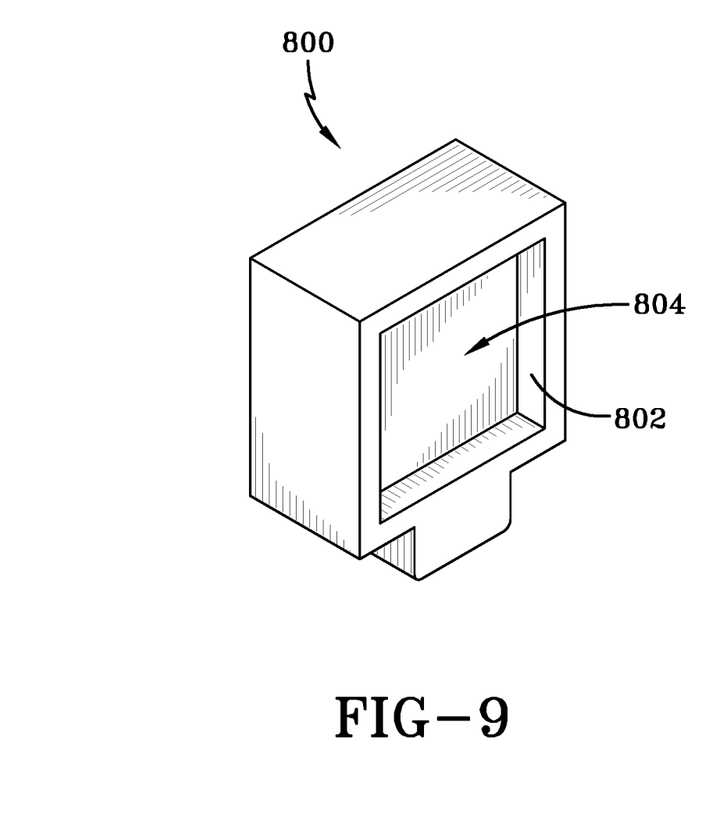
FIG. 9 is a perspective view of a holder for holding a material being tested by the DMA system in accordance with the various embodiments disclosed herein.

In addition, the material 60 may be secured to the clamp assembly 40 using one or more holders 800, as shown in FIG. 9. The holder 800 includes a wall 802 that defines an aperture or a cavity 804 having a closed end in which the material sample 60 may be slidingly received. The holder 800 may be shaped and dimensioned to be slidingly received in the cavity 555 of the clamp members 500,510. As such, when the holder is used, one or more of the jaws 600,610 are replaced with the holder 800 to allow the material 60 to achieve the desired level or type of retention within the clamp assembly 40. That is, the holder 800 serves to support the material sample 60 when the material sample 60 is retained in the clamp assembly 40 and subjected to the high frequency forces applied by the actuator 30. The wall 802 of the holder 800 may have textured surfaces, contoured surfaces, projections, such as gripping teeth or pins, and the like to enhance the gripping ability of holder 800 with respect to the material sample 60. It should be appreciated that in some embodiments, the material sample 60 may be held by the clamp assembly 40 without the use of any holder 800.

Figure 1:
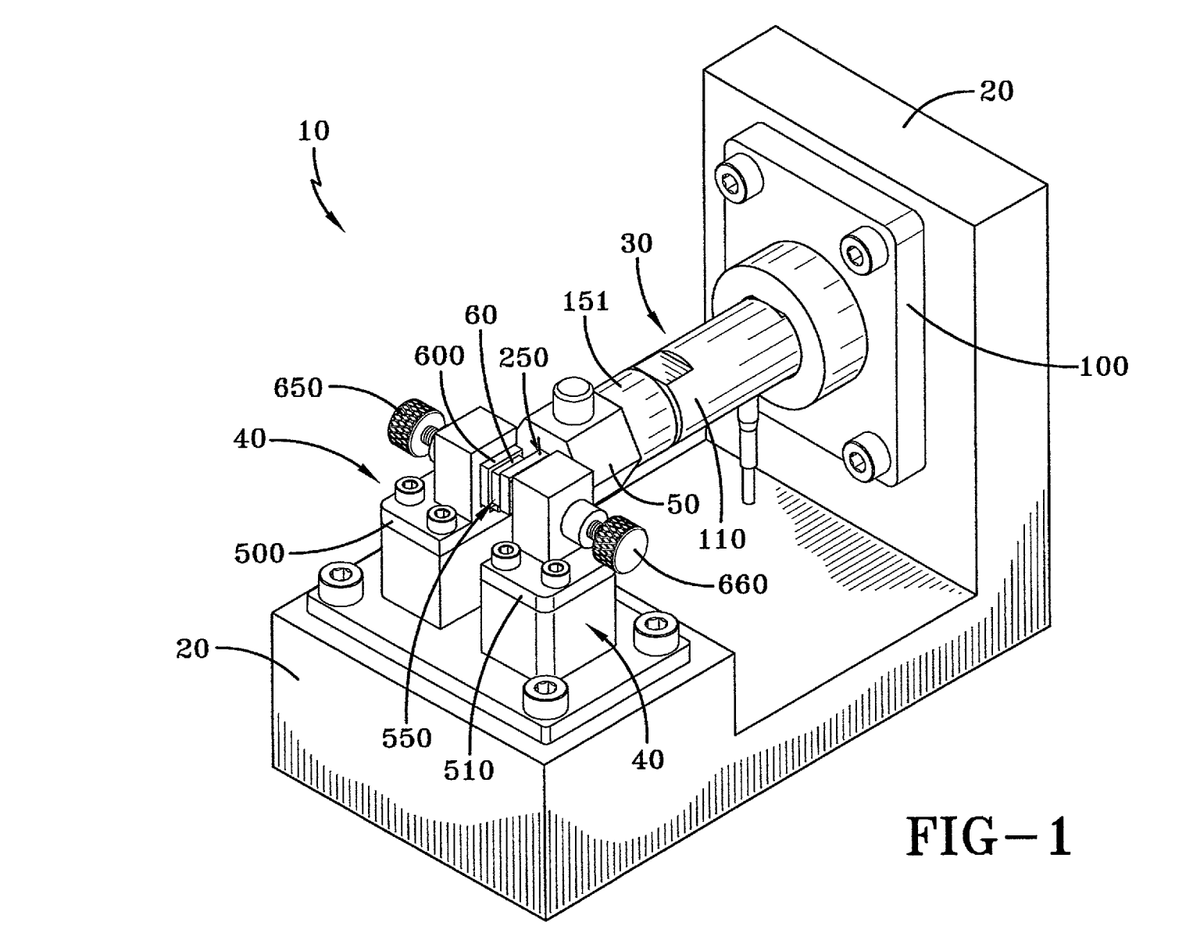
FIG. 1 is a perspective view showing a dynamic mechanical analysis (DMA) system in accordance with the various embodiments disclosed herein.
Figure 2:
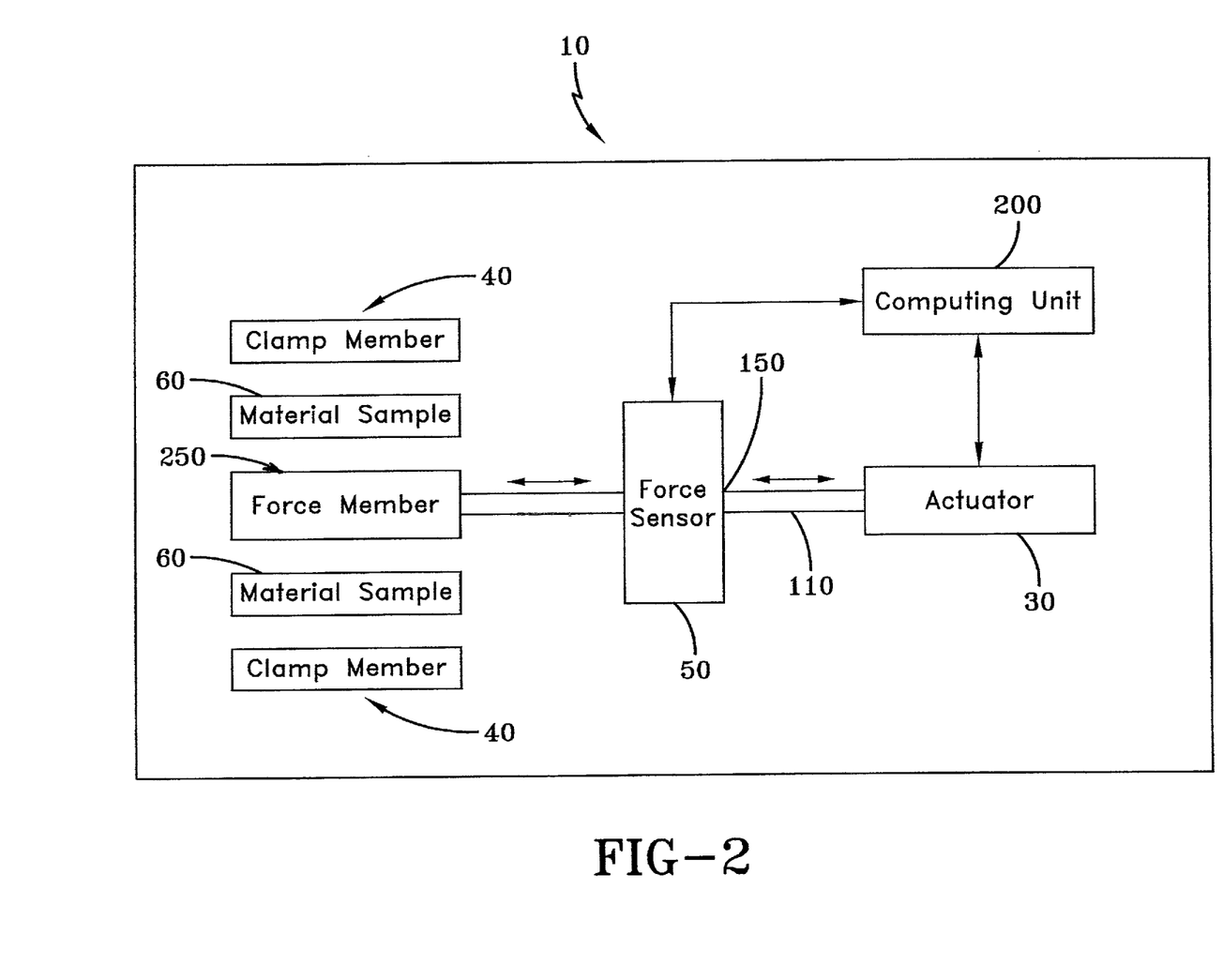
FIG. 2 is a block diagram of the DMA system in accordance with the various embodiments disclosed herein.
Figure 3:
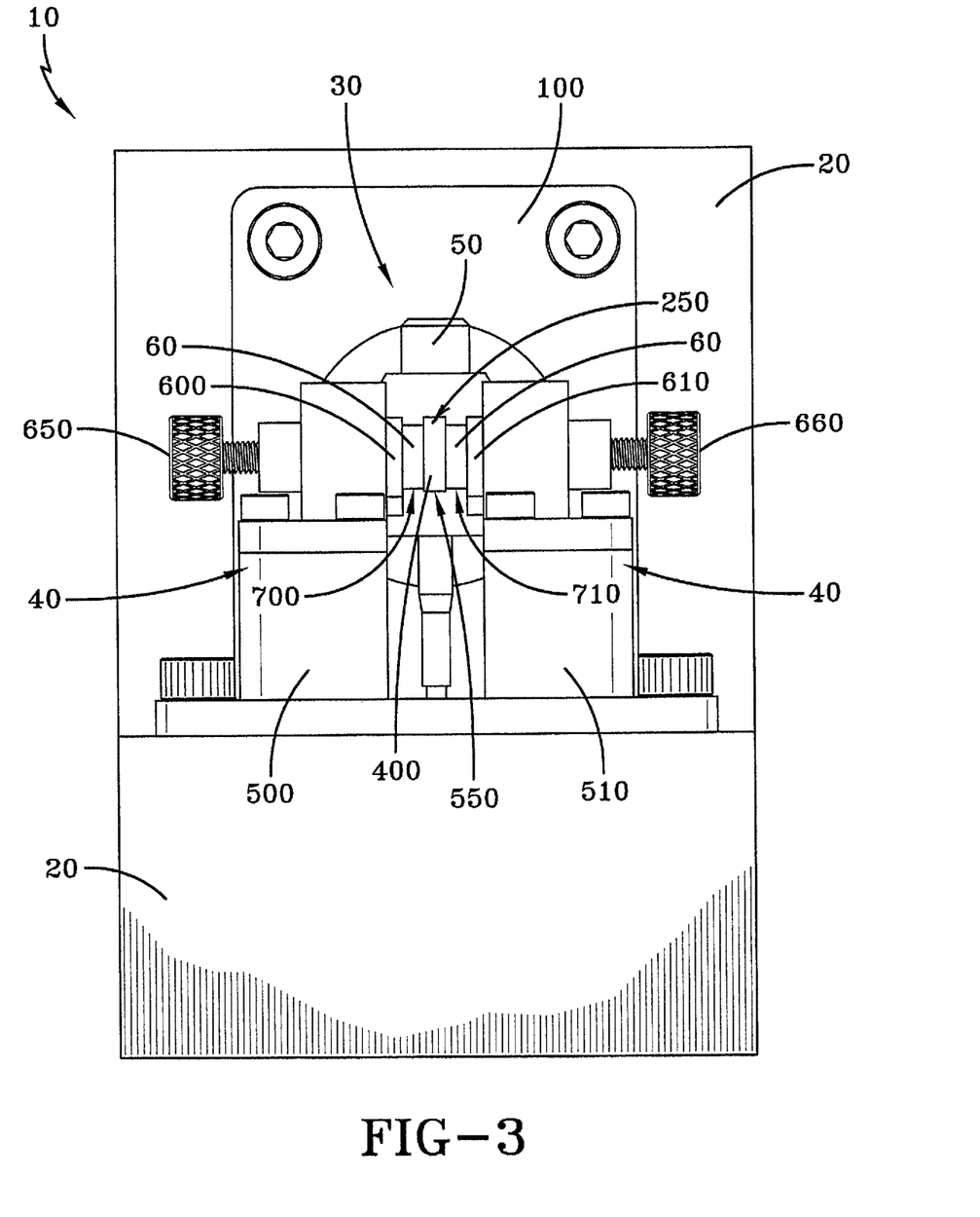
FIG. 3 is an front elevation view of the DMA system in accordance with the various embodiments disclosed herein.
Figure 4:
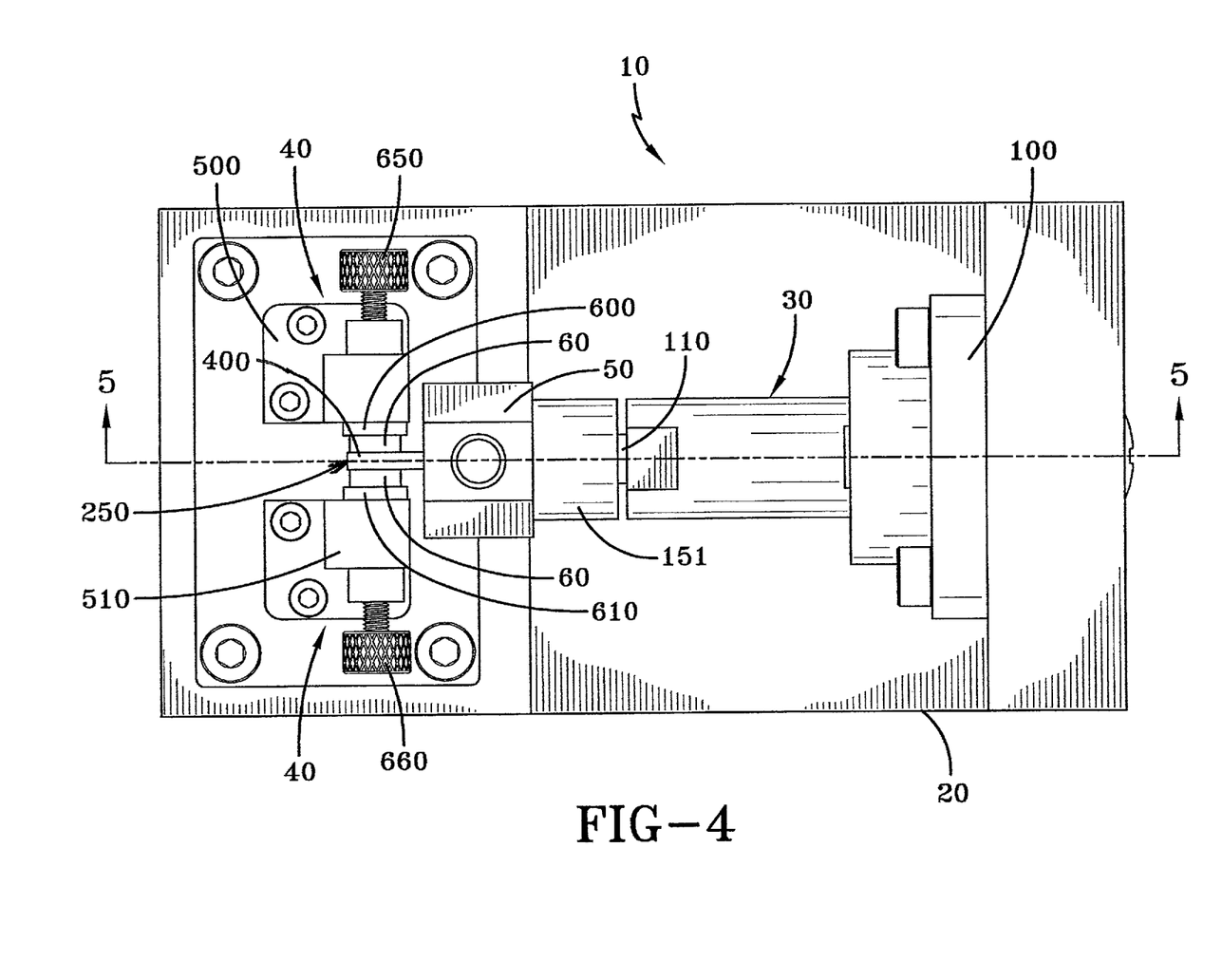
FIG. 4 is a top plan view of the DMA system in accordance with the various embodiments disclosed herein.
Figure 5:
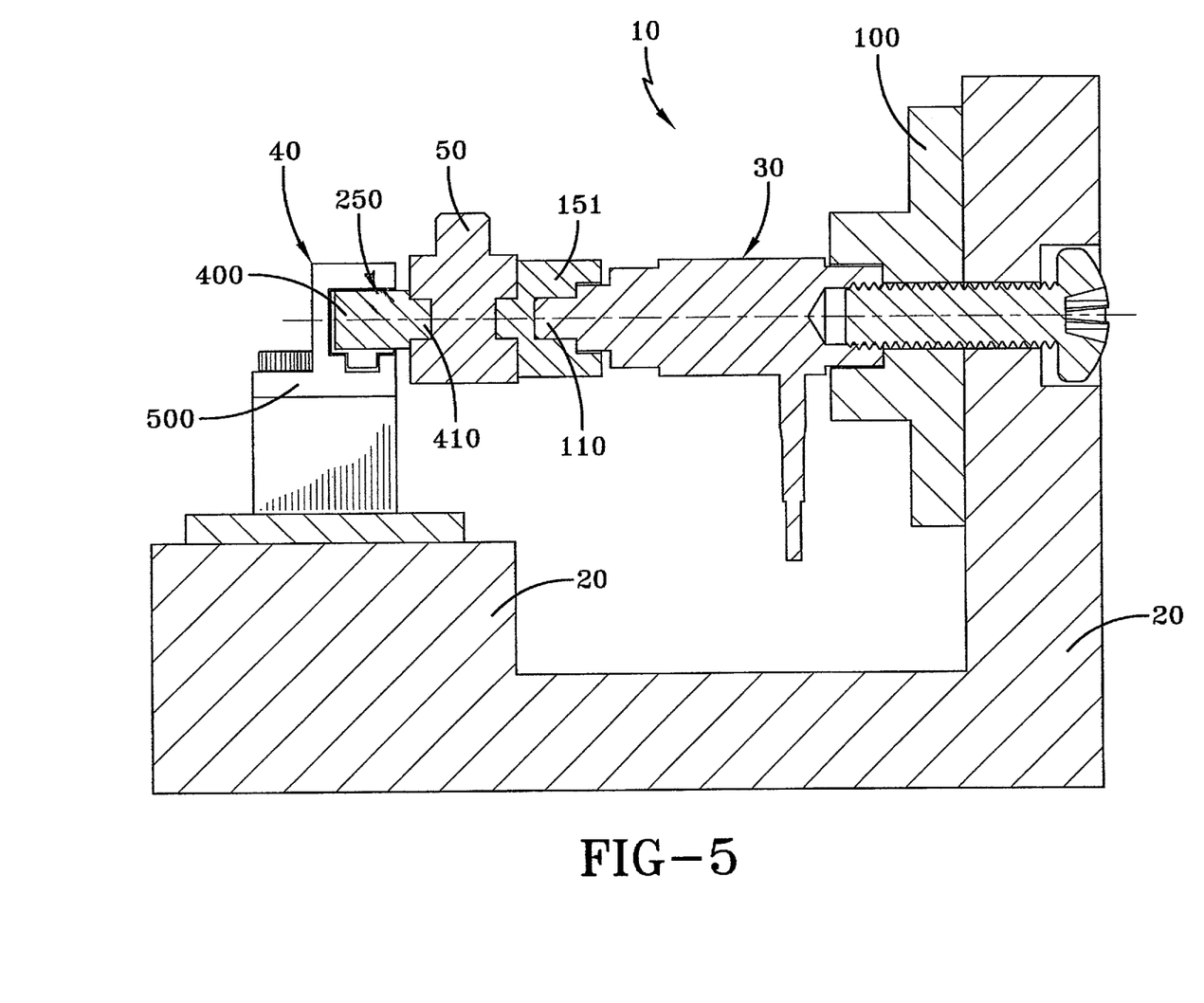
FIG. 5 is a cross-section view of the DMA system taken along line A-A shown in FIG. 4 in accordance with the various embodiments disclosed herein.

Continuing, the computing unit 200 may comprise any suitable combination of hardware and software that is configured to carry out the various functions disclosed herein. In some embodiments, the computing unit 200 may be directly or remotely coupled to the components of the system 10, as shown in FIG. 2, so as to communicate with the force sensor 50 and the actuator 30. It should be appreciated that such communication between the computing unit 200 and the force sensor 50 or between the computing unit 200 and the actuator 30 may be unidirectional or bidirectional. Continuing, the computing unit 20 may comprise a local or remote computing unit, such as a cloud computing unit, and may communicate with the actuator 30 and the force sensor 50 using a wired or wireless communication interface or network. In addition, the computing unit 200 may comprise a portable or standalone computing unit. As such, the computing unit 200 receives electrical data signals from the force sensor 50 and supplies control signals to the actuator 30 to control its operation. In addition, the computing unit 200 may receive data associated with the operation of the actuator 30 as well. Furthermore, it should be appreciated that in some embodiments the system 10 is configured as a closed-loop control system. That is, the system 10 may be operated in an open-loop or a closed-loop mode to control the actuator 30. In the closed-loop mode, the actuator 30 is controlled with higher precision, and enhanced linearity and repeatability, while eliminating drift and hysteresis. In some embodiments, the closed-loop control system includes subnanometer resolution and bandwidths of up to about 10 kHz. A servo controller (e.g. digital or analog) embodied by the computing unit 200 is configured to determine the output voltage to be supplied to the actuator 30 by comparing a reference signal (commanded position) to the actual sensor position signal. Because the system 10 may use a strain driven process, whereby a strain is applied and a resultant force is measured, a closed loop control system is desired to control the displacement of the actuator 30 at a specific frequency of applied force. That is, the computing unit 200 operating in a closed loop is capable of adjusting the displacement of the actuator at a desired value, and may be configured to provide multi-channel data acquisition with high resolution and high sampling rates, while also calculating one or more of a drag force against the movement of the actuator 30 and clamp assembly 40, and the calculation of the heat build-up in the material 60 during testing. In some embodiments, during the operation of the system 10, the force vibration at a specific frequency and amplitude may be provided by an oscilloscope or other suitable device, and this vibration is an input for the control system 200, which may be embodied by the computing unit 200 and amplifier. From the control system provided by the computing unit 200, displacement data is transferred to the oscilloscope. The displacement and force data is the coefficient of a working voltage of the force and displacement sensors. Data is transferred from the force sensor to a multichannel oscilloscope, where the captured data may be processed using known techniques to calculate one or more viscoelastic properties of the material sample 60. It should be appreciated that the force sensor 50 may operate as a displacement sensor, so as to function as a strain gauge. As such, the sensor 50 forms a closed-loop together with the computing unit 200 and the actuator 30.

Figure 8A:
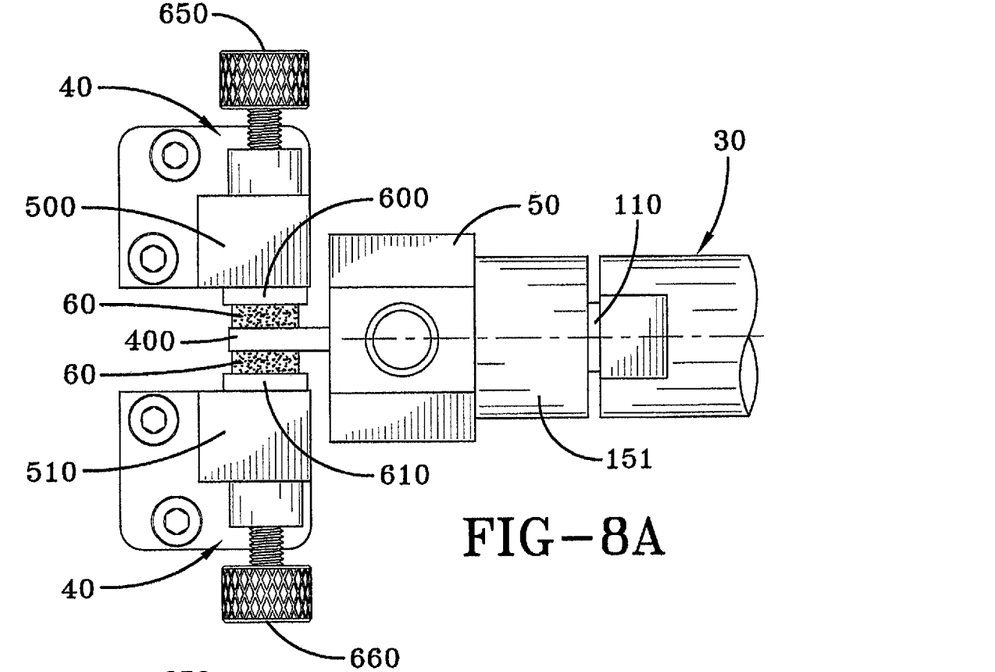
FIG. 8A is a top plan view of the floating clamp in an initially resting position where no force is being applied to the material in accordance with the various embodiments disclosed herein.
Figure 8B:
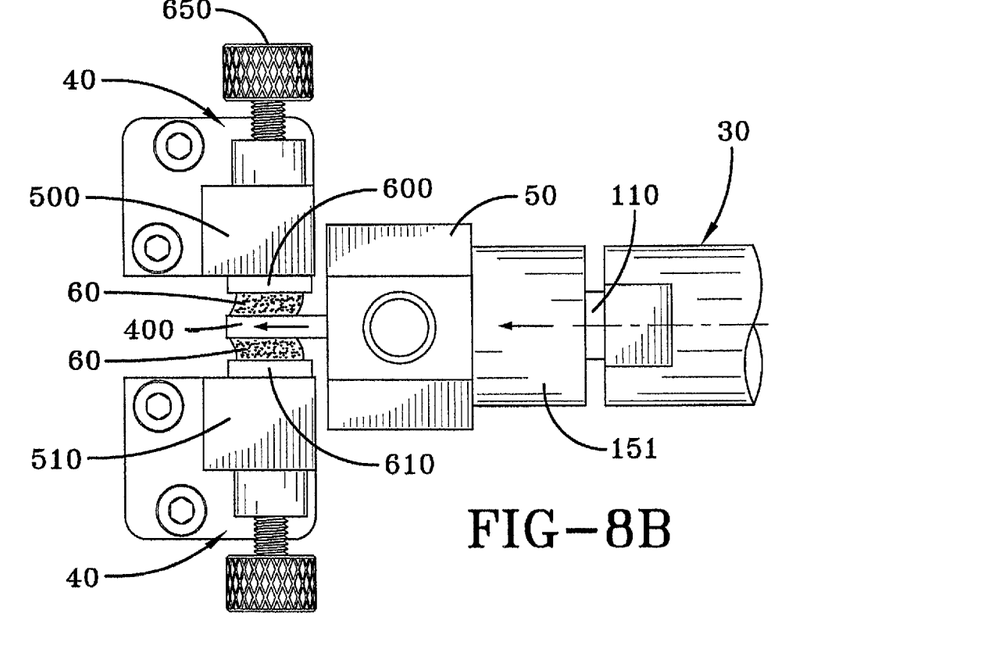
FIG. 8B is a top plan view of the floating clamp in an active position applying force to the material in accordance with the various embodiments disclosed herein.

During operation of the system 10, the control unit 200 is configured to move the actuator arm 110 from an initial resting position, where no shear force is applied to the material 60, as shown in FIG. 8A, to a position shown in FIG. 8B, where a specific amount of strain (force) is applied to the material 60 via the force member 250 at a desired high frequency. This allows a direct measurement of the viscoelastic properties of the material sections 60 to be made. It should be appreciated that the computing unit 200 may be used in conjunction with the force sensor 50 to measure the force that the material 60 is exposed to, while measuring an elapsed time (i.e. time gap) between the displacement and the force that leads to tan delta. Thus, the computing unit 200 receives input from the actuator 30 and from the force sensor 50. Furthermore, in some embodiments, the actuator 30 receives force frequency data from the computing unit 200 to control the operation of the actuator 30.

Therefore, one advantage of the various embodiments disclosed herein is that a dynamic mechanical analysis (DMA) system identifies properties of viscoelastic materials without the use of WLF equations. Another advantage of the various embodiments disclosed herein is that a dynamic mechanical analysis (DMA) system is capable of performing a high frequency shear test directly, without any other analysis technique such as superposition, to identify tan delta and loss and storage modulus for example. Still another advantage of the various embodiments disclosed herein is that a dynamic mechanical analysis (DMA) system includes a clamp for holding the specimen that is compatible with high frequency testing. Yet another advantage of the various embodiments disclosed herein is that a dynamic mechanical analysis (DMA) system includes a high frequency actuator to perform high frequency analysis of viscoelastic materials, such as tire rubber. Still yet another advantage of the various embodiments disclosed herein is that a dynamic mechanical analysis (DMA) system includes an actuator that is capable of a displacement amplitude of between about 0.05 to 0.75%.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A forced vibration dynamic mechanical analysis (DMA) system comprising:
    a fixture;
    an actuator attached to said fixture;
    a force sensor carried by said actuator;
    an adjustable clamp assembly attached to said fixture and adapted to hold a viscoelastic material in contact with a plate which is attached to said force sensor; and
    a computing unit in operative communication with said force sensor and said actuator;
    wherein said actuator is configured to be controlled by said computing unit to apply a periodic force directly through said force sensor to the material at a test frequency between 100 Hz to 10 kHz, and wherein said force sensor measures said periodic force applied by said actuator to the material.

2. The system of claim 1, wherein said force is a shear force.

3. The system of claim 1, wherein said actuator is a piezoelectric actuator.

4. The system of claim 1, wherein said force sensor is a piezoelectric sensor.

5. The system of claim 1, wherein said adjustable clamp assembly comprises:
   a first clamp member attached to said fixture;
   a second clamp member attached to said fixture;
   said plate attached to said actuator by said force sensor;
   wherein the material comprises a first piece of material and a second piece of material separate from said first piece of material, wherein said clamp assembly is configured such that the first piece of material is positionable between said first clamp member and said plate, and said second piece of material is positionable between said second clamp member and said plate.

6. The system of claim 5, wherein said first and second clamp members each carry an adjustable jaw that correspondingly engage said first and second pieces of material.

7. The system of claim 5, wherein said first and second clamp members each carry an adjustable holder having a cavity, such that said cavity of said holder associated with said first clamp member is configured to receive at least a portion of the first piece of material and said cavity of said holder associated with said second clamp member is configured to receive at least a portion of the second piece of material.

8. The system of claim 1, wherein said test frequency is between 1 kHz and 10 kHz.

9. The system of claim 1, wherein a natural frequency of said fixture is greater than said test frequency.

10. The system of claim 9, wherein said natural frequency is at least twice said test frequency.

11. A method of testing a viscoelastic material with forced vibration comprising:
   fixing the viscoelastic material in a stationary position to a fixture;
   applying a periodic force directly through a force sensor to a plate in contact with the material at a test frequency between 100 Hz to 10 kHz by an actuator attached to said fixture; and
   identifying at least one viscoelastic property associated with the material based on said applying step detected by said force sensor.

12. The method of claim 11, further comprising:
   monitoring a force applied to the material by said plate which is associated with said force sensor carried by said actuator,
   wherein said at least one viscoelastic property is based on said force identified by said force sensor.

13. The method of claim 11, wherein said periodic force is a shear force.

14. The method of claim 11, wherein the viscoelastic material comprises a first piece of material and a second piece of material wherein said first and second pieces of material are separate from each other, said fixing step comprising:
   providing a first clamp member and a second clamp member that are attached to said fixture;
   providing said plate between said first clamp member and said second clamp member;
   holding the first piece of material section between said first clamp member and said plate; and
   holding said second piece of material section between said second clamp member and said plate;
   wherein said periodic force is applied to the said first and said second pieces of material by said plate.

15. The method of claim 14, wherein said first and second clamp members each carry an adjustable jaw that correspondingly engage said first and said second pieces of material.

16. The system of claim 14, wherein said first and second clamp members each carry an adjustable holder having a cavity, such that said cavity of said holder associated with said first clamp member is configured to receive at least a portion of the first piece of material section and said cavity of said holder associated with said second clamp member is configured to receive at least a portion of the second piece of material.

17. The method of claim 11, wherein said frequency is between 1 kHz and 10 kHz.

18. The method of claim 11, wherein a natural frequency of said fixture is greater than said test frequency.

19. The method of claim 18, wherein said natural frequency is at least twice said test frequency.

* * * * *

UNITED STATES PATENT AND TRADEMARK OFFICE
CERTIFICATE OF CORRECTION

PATENT NO. : 10,809,170 B2  
APPLICATION NO. : 16/037426  
DATED : October 20, 2020  
INVENTOR(S) : Siamak Farhad and Roja Esmaeeli Page 1 of 1

It is certified that error appears in the above-identified patent and that said Letters Patent is hereby corrected as shown below:

Column 10, Line 18 (Claim 14) the words "material section between" should read --material between--

Column 10, Line 20 (Claim 14) the words "material section between" should read --material between--

Column 10, Line 32 (Claim 16) the words "material section and" should read --material and--

Signed and Sealed this  
Twenty-second Day of December, 2020

Andrei Iancu  
*Director of the United States Patent and Trademark Office*